US009064112B2

(12) United States Patent
Wang et al.

(10) Patent No.: US 9,064,112 B2
(45) Date of Patent: Jun. 23, 2015

(54) MALWARE DETECTION FOR SMS/MMS BASED ATTACKS

(75) Inventors: Wei Wang, Hoboken, NJ (US); Gang Xu, Piscataway, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 386 days.

(21) Appl. No.: 12/964,015

(22) Filed: Dec. 9, 2010

(65) Prior Publication Data

US 2012/0151588 A1 Jun. 14, 2012

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/56* | (2013.01) |
| *H04L 12/58* | (2006.01) |

(Continued)

(52) U.S. Cl.
CPC ............... *G06F 21/56* (2013.01); *H04L 51/12* (2013.01); *H04L 51/38* (2013.01); *G06F 21/554* (2013.01); *H04L 63/1491* (2013.01); *H04W 12/12* (2013.01); *G06F 2221/2123* (2013.01)

(58) Field of Classification Search
CPC ....... G06F 21/56; G06F 21/566; H04L 63/14; H04L 63/145; H04W 12/06; H04W 12/10
USPC ...................... 726/22–25; 709/220, 224, 229; 455/466, 412.1
See application file for complete search history.

(56) References Cited

U.S. PATENT DOCUMENTS

| | | | | |
|---|---|---|---|---|
| 7,266,845 | B2 * | 9/2007 | Hypponen | 726/24 |
| 7,676,217 | B2 * | 3/2010 | Zhu et al. | 455/411 |

(Continued)

FOREIGN PATENT DOCUMENTS

| | | | | |
|---|---|---|---|---|
| SE | WO 2009082306 | * | 12/2007 | H04Q 7/34 |
| WO | PCT/SE2007/051068 | * | 2/2009 | 726/24 |

OTHER PUBLICATIONS

Zou, C. Gao, L., Gong, W., Towsley, D., "Monitoring and early warning for internet worms", CCS '03 Proceedings of the 10th ACM conference on Computer and communications security, 2003, pp. 190-199 [retrieved on Jun. 17, 2012 from ACM database].*

(Continued)

*Primary Examiner* — Saleh Najjar
*Assistant Examiner* — Feliciano Mejia
(74) *Attorney, Agent, or Firm* — Hartman & Citrin LLC (57) ABSTRACT

Devices, systems, and methods are disclosed which utilize lightweight agents on a mobile device to detect message-based attacks. In exemplary configurations, the lightweight agents are included as contacts on the mobile device addressed to an agent server on a network. A malware onboard the mobile device, intending to propagate, unknowingly addresses the lightweight agents, sending messages to the agent server. The agent server analyzes the messages received from the mobile device of the deployed lightweight agents. The agent server then generates attack signatures for the malware. Using malware propagation models, the system estimates how many active mobile devices are infected as well as the total number of infected mobile devices in the network. By understanding the malware propagation, the service provider can decide how to deploy a mitigation plan on crucial locations. In further configurations, the mechanism may be used to detect message and email attacks on other devices.

20 Claims, 8 Drawing Sheets (51) Int. Cl.
*G06F 21/55* (2013.01)
*H04L 29/06* (2006.01)
*H04W 12/12* (2009.01)

(56) References Cited

U.S. PATENT DOCUMENTS

| | | | |
|---|---|---|---|
| 7,847,710 B2* | 12/2010 | Aciicmez et al. | 341/51 |
| 7,861,303 B2* | 12/2010 | Kouznetsov et al. | 726/24 |
| 7,945,955 B2* | 5/2011 | Katkar | 726/22 |
| 8,087,085 B2* | 12/2011 | Hu et al. | 726/24 |
| 8,090,393 B1* | 1/2012 | Whitehouse | 455/466 |
| 8,667,581 B2* | 3/2014 | Steeves et al. | 726/22 |
| 2006/0128406 A1 | 6/2006 | MaCartney | |
| 2007/0123214 A1 | 5/2007 | Mock | |
| 2010/0071051 A1 | 3/2010 | Choyi et al. | |
| 2010/0328064 A1* | 12/2010 | Rogel | 340/540 |
| 2011/0295982 A1* | 12/2011 | Misra | 709/220 |

OTHER PUBLICATIONS

Sarat, S.; Terzis, A., "On Using Mobility to Propagate Malware", Modeling and Optimization in Mobile, Ad Hoc and Wireless Networks and Workshops, 2007. WiOpt 2007. 5th International Symposium on; 2007 , pp. 1-8 [retrieved on Jun. 17, 2012 from IEEE database].* J. Cheng "SmartSiren: Virus Detection and Alert for Smartphones", Proc. 5 th Int\'l Conf. Mobile Systems, Applications and Services (MobiSys 07), pp. 258-271 2007 [retrieved from ACM database on Feb. 2, 2013].* Trautschold, Martin, and Gary Mazo. "Your Contact List." BlackBerry Curve Made Simple (2010): 275-294. [retrieved from Internet on Feb. 2, 2013].* 8.A. Shabtai, U. Kanonov, Y. Elovici, "Intrusion Detection on Mobile Devices Using the Knowledge Based Temporal-Abstraction Method," Journal of Systems and Software, vol. 83(8), 2010, pp. 1524-1537. [retrieved from ScienceDirect database on Feb. 2, 2013].*

* cited by examiner

MALWARE DETECTION FOR SMS/MMS BASED ATTACKS

BACKGROUND OF THE SUBJECT DISCLOSURE

1. Field of the Subject Disclosure

The present subject disclosure relates to mobile devices. In particular, the present subject disclosure relates to the detection of message-based malware attacks.

2. Background of the Subject Disclosure

Mobile devices, such as cellular telephones, have become a common tool of everyday life. Cellular telephones are no longer used simply to place telephone calls. With the number of available features rapidly increasing, cellular telephones are now used for storing addresses, keeping a calendar, reading e-mails, drafting documents, etc. These devices are small enough that they can be carried in a pocket or purse all day, allowing a user to stay in contact almost anywhere. Recent devices have become highly functional, providing applications useful to business professionals as well as the casual user.

Mobile devices are frequently used for sending and receiving messages. Such devices may, for instance, send basic text messages using Short Message Service (SMS) and enhanced messages using Multimedia Messaging Service (MMS). Unfortunately, nowadays, the number of abilities also allows mobile devices to introduce new malware propagation vectors such as SMS/MMS messaging and file transfers. MMS messages can embed text, audio, images and video. Thus, messaging is a very powerful way to spread different types of malware. Many prevalent viruses, worms and Trojans utilize SMS/MMS as the propagation media, such as Mabir 2004, Commwarrior 2005, Skulls 2005, Redbrowser 2006, and Trojan-SMS.AndroidOS 2010.

Unlike proximity-based scanning which is limited to a small local area, mobile malware that exploits SMS/MMS for propagation is capable of worldwide damage, similar to nationwide attacks on the Internet. Introducing new mobile malware becomes easy for attackers via SMS/MMS messages, because messages can be routed across different network domains. Also, the propagation is much faster than proximity based attacks. A malicious mobile user can randomly pick a batch of victims from the contacts and spread viruses, worms, or Trojans.

Because of the scale-free nature of the SMS/MMS based malware distribution, it is challenging to analyze and monitor the status of the propagation. The number of phones that are infected, the number of currently active phones spreading viruses, and even identification of devices that are taking these actions need to be determined across the whole network in real time. It is also challenging to collect signatures for such attacks starting on day one.

Therefore, what are needed are devices, systems, and methods to collect and analyze information concerning a malware without unnecessarily affecting the performance of the device.

SUMMARY OF THE SUBJECT DISCLOSURE

The present subject disclosure solves the above problems by utilizing lightweight agents on a mobile device to detect message-based attacks. In exemplary embodiments, the lightweight agents are included as contacts on the mobile device addressed to an agent server on a network. A malware onboard the mobile device, intending to propagate, unknowingly addresses the lightweight agents, sending messages to the agent server. The agent server analyzes the messages received from the mobile device of the deployed lightweight agents. The agent server then generates attack signatures for the malware. Using malware propagation models, the system estimates how many active mobile devices are infected as well as the total number of infected mobile devices in the network. By understanding the malware propagation, the service provider can decide how to deploy a mitigation plan on crucial locations. In further embodiments, the mechanism may be used to detect message and email attacks on other devices.

In one exemplary embodiment, the present subject disclosure is a mobile device for detecting message-based malware on a network. The mobile device includes a processor; a transceiver in communication with the processor to enable communication with the network; a memory in communication with the processor; a plurality of contacts stored on the memory; a lightweight agent stored in the plurality of contacts; and a malware on the memory. The malware, in an attempt to spread to a target mobile device by sending a message to a selected contact within the plurality of contacts, selects the lightweight agent. The lightweight agent is hidden to a user of the mobile device but indistinguishable from the plurality of contacts by the malware.

In another exemplary embodiment, the present subject disclosure is a system for detecting messaging-based malware. The system includes a cellular network; a source mobile device in communication with the cellular network, the source mobile device containing a malware and a contact list including a lightweight agent; and an agent server on the cellular network, the agent server containing an agent logic. The malware cannot distinguish between contacts on the contact list and the lightweight agent, the lightweight agent being an address of the agent server. The malware selects the lightweight agent and sends a message to the agent server, the agent server receiving the message.

In yet another exemplary embodiment, the present subject disclosure is a method of detecting messaging-based malware in a network. The method includes receiving a message at an agent server from a source mobile device, the source mobile device containing a malware; determining a signature of the malware from the message; and determining a propagation rate of the malware. The malware selects a lightweight agent from within contacts of the source mobile device, the lightweight agent being the address of the agent server. The malware sends the message to the agent server via the mobile device.

DETAILED DESCRIPTION OF THE SUBJECT DISCLOSURE

The present subject disclosure presents devices, systems, and methods utilizing lightweight agents on a mobile device to detect message-based attacks. In exemplary embodiments, the lightweight agents are included as contacts on the mobile device addressed to an agent server on a network. A malware onboard the mobile device, intending to propagate, unknowingly addresses the lightweight agents, sending messages to the agent server. The agent server analyzes the messages received from the mobile device of the deployed lightweight agents. The agent server then generates attack signatures for the malware. Using malware propagation models, the system estimates how many active mobile devices are infected as well as the total number of infected mobile devices in the network. By understanding the malware propagation, the service provider can decide how to deploy a mitigation plan on crucial locations. In further embodiments, the mechanism may be used to detect message and email attacks on other devices.

In order to detect SMS/MMS attacks and create statistics for the status of a malware infection within a network, the present subject disclosure deploys lightweight agents at each mobile device. The lightweight agents are each a telephone number or address that resides within the mobile device and are associated with an agent server on the network. The lightweight agents may come directly from the manufacturer or be loaded by the user, the network, etc. The lightweight agents reside within the contacts of the mobile device, but are invisible to users. For instance, when a user selects destination contacts from their contact lists to send SMS/MMS messages, the user does not see the lightweight agents and will not send any messages to the lightweight agents. However, when an attacker, such as a malware, tries to pick up random contacts from the contact list, the attacker may select one or more of the lightweight agents. As selecting a lightweight agent from the contact list is equally as likely as selecting any other contact, with a certain probability the lightweight agent numbers are picked along with other contacts. This operates under the assumption that the malware lacks the intelligence to differentiate the lightweight agents from any other contact. In order to propagate the malware, the attacker sends messages to these selected contacts, possibly including the lightweight agents.

By collecting the message sources, the phone numbers of the mobile devices, and aggregating how many messages are received at the agent server, the system identifies the number of mobile devices that are infected, the number of active mobile devices spreading malware, and the identities of mobile devices which are taking actions in the network in real time.

The deployment of the lightweight agent-based system is very simple and does not use any of the radio resources of the network when the network is attack free. The system utilizes a passive detection, and is only active when message-based malware propagation exists in the network. According to embodiments of the subject disclosure, only three hidden lightweight agents are needed for an average of fifty contacts in the mobile device's contact list. Any time a message based attack is taking action, the system detects the attack in real time due to receiving messages from the mobile device. By tracing back the telephone numbers, the system identifies the infected mobile devices.

"Mobile device", as used herein and throughout this disclosure, refers to any electronic device capable of wirelessly sending and receiving data. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a wireless network, or a wireline network. A "network" can include broadband wide-area networks such as cellular networks, local-area networks (LAN), and personal area networks, such as near-field communication (NFC) networks including BLUETOOTH®. Communication across a network is preferably packet-based; however, radio and frequency/amplitude modulations networks can enable communication between mobile devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device. A network typically includes a plurality of elements that host logic for performing tasks on the network.

In modern packet-based wide-area networks, servers may be placed at several logical points on the network. Servers may further be in communication with databases and can enable mobile devices to access the contents of a database. Billing servers, application servers, etc. are examples of such servers. A server can include several network elements, including other servers, and can be logically situated anywhere on a service provider's network, such as the back-end of a cellular network. A server hosts or is in communication with a database hosting an account for a user of a mobile device. The "user account" includes several attributes for a particular user, including a unique identifier of the mobile device(s) owned by the user, relationships with other users, application usage, location, personal settings, business rules, bank accounts, and other information. A server may communicate with other servers on different networks to update a user account.

For the following description, it can be assumed that most correspondingly labeled structures across the figures (e.g., 113 and 213, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1:
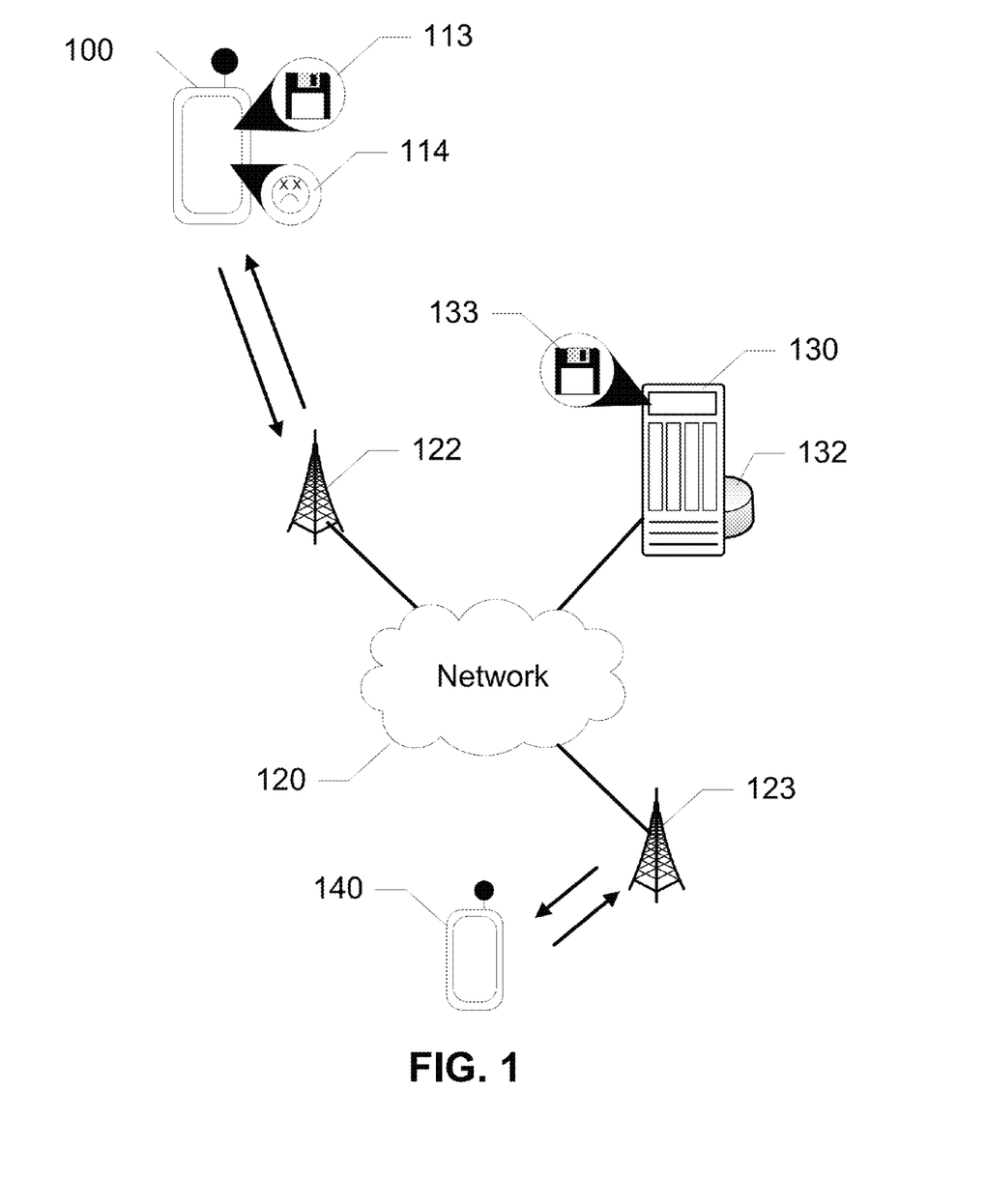
FIG. 1 shows a system for detection of message-based attacks, according to an exemplary embodiment of the present subject disclosure.

FIG. 1 shows a system for detection of message-based attacks, according to an exemplary embodiment of the present subject disclosure. In this embodiment, the system includes a source mobile device 100, target mobile device 140, a cellular network 120, and an agent server 130 on cellular network 120.

Source mobile device 100 is in communication with cellular network 120 to send and receive messages, make voice calls, access data services, etc. In this embodiment, source mobile device 100 has been infected with malware 114. Malware 114 is software designed to secretly access a device without the owner's informed consent. Malware 114 may have been sent to source mobile device 100 in a MMS or SMS message, in a download, over a network, etc. Malware 114 attempts to spread to other devices, such as target mobile device 140, by sending infected messages to contacts stored within source mobile device 100. These messages, as well as messages created by the user of source mobile device 100, are transmitted to cellular network 120 via a base transceiver station 122. Source mobile device 100 also contains a lightweight agent logic 113. Lightweight agent logic 113 inserts lightweight agents into the contacts of source mobile device 100. A lightweight agent is essentially an address, such as a telephone number, of agent server 130 or a location on agent server 130. Malware 114, when selecting contacts to infect, unknowingly selects the lightweight agents along with other contacts. Malware 114 then creates a message, such as an SMS or MMS message, and sends the message to the selected contacts. Messages sent to the lightweight agents are delivered to agent server 130.

In embodiments of the subject disclosure, lightweight agent logic 113 also hides or distinguishes the lightweight agents for the user of source mobile device 100. For instance, when the user is viewing contacts, the lightweight agents are not displayed with the rest of the contacts. The lightweight agents remain within the contacts, but are not displayed, and thus will not be selected by the user. Alternatively, the lightweight agents may display differently than other contacts, such as by making the lightweight agents a different color or contrast. In these ways, lightweight agent logic 113 makes lightweight agents more difficult for a user to select, while keeping the lightweight agents within the contacts. Therefore, the lightweight agents are likely only selected by malware 114, not the user.

Cellular network 120 provides a radio network for communication between devices, including source mobile device 100 and target mobile device 140. Service providers such as wireless carriers typically provide service to a geographic market area by dividing the area into many smaller areas or cells. Each cell is serviced by a radio transceiver, such as base transceiver stations 122 and 123. Base transceiver stations 122 and 123 connect to other elements of cellular network 120 that are known in the art and therefore not shown. For instance, base transceiver stations 122 and 123 connect to Mobile Switching Centers (MSCs) through landlines or other communication links, and the MSCs may, in turn, be connected via landlines to the Public Switched Telephone Network (PSTN), to other cellular networks, to IP networks, etc. Many other components are present in cellular network 120, but are not presented for sake of simplicity. These components will be apparent to one of ordinary skill in the art in light of this disclosure.

Agent server 130 is a server located on cellular network 120 to which lightweight agents are addressed. According to embodiments of the subject disclosure, agent server 130 receives messages from source mobile device 100. As lightweight agent logic 113 on source mobile device 100 has hidden the lightweight agents from the user, the messages received at agent server 130 are sent by malware 114. As source mobile device 100 may contain multiple lightweight agents, different lightweight agents may deliver messages to different locations on agent server 130, all to the same location on agent server 130, to further agent servers on network 120, etc. Agent server 130 contains an agent logic 133. Agent logic 133 detects a message delivered to agent server 130 and alerts network 120 and/or a service provider of malware 114 located on source mobile device 100. Agent logic 133 further determines a signature of malware 114, the signature inherently included in messages sent by malware 114. The signature is unique attributes of the message, such as content of the message, the sender of the message, the origin of the message, etc. Agent logic 133 may use the signature as well as previous signatures collected from messages from source mobile device 100 and/or other source mobile devices, to trace the message to an originator of malware 114. Agent server 130 may use an agent database 132 to store signatures of messages in order to determine and/or gain as much information as possible about any malware on network 120. Agent server 130 utilizes algorithms in agent logic 133 to determine a propagation rate of malware 114. Such algorithms may utilize probability theory, sampling theory, etc., in such determinations. This information may be used to predict the spread of malware 114 on network 120. For instance, the algorithm is used to determine a number of mobile devices infected at five minutes, at ten minutes, etc. Thus, agent server 130 knows how many mobile devices are currently infected and agent server 130 can predict future infections. This allows agent server 130 to determine whether malware 114 will spread, for instance, nationwide, or whether malware 114 is contained.

In embodiments of the subject disclosure, agent server 130 may further leverage the information accumulated to instruct source mobile device 100 and/or network 120 to behave differently going forward. For instance, agent server 130 may notify network 120 that source mobile device 100 contains and is attempting to spread malware 114. Network 120 may decide to prevent source mobile device 100 from connecting to network 120, may limit capabilities of source mobile device 100, etc.

In embodiments of the subject disclosure utilizing multiple agent servers, each lightweight agent may address a different agent server. Each of the agent servers collects messages and may perform individual calculations. The agent servers may further report to a central agent server which gathers the relevant information from each agent server and makes further calculations for the entire network.

Target mobile device 140 is a device capable of communicating with cellular network 120 via, for instance, base transceiver station 123. Target mobile device 140 has a plurality of capabilities for receiving content. Target mobile device 140 becomes a target as, for instance, its address is located within the contacts of source mobile device 100. If the address of target mobile device 140 is selected by malware 114 on source mobile device 100, source mobile device 100 sends a message including malware 114 to target mobile device 140. The act of receiving and/or opening the message at target mobile device 140 may spread malware 114 to target mobile device 140. Malware 114, now on target mobile device 140, may further try to spread itself from target mobile device 140 similar to that of source mobile device 100. Target mobile device 140 may further include lightweight agent logic 113 similar to that on source mobile device 100. Thus, when malware 114 attempts to propagate from target mobile device 140, messages are sent to agent server 130. By including lightweight agent logic 113 on multiple devices on network 120, agent server 130 is able to gain further information as to the propagation of malware 114.

For example, the source mobile device 100 has been infected with a malware 114. This infection occurred when the user of the source mobile device 100 opened an infected SMS message. The malware 114, now on the source mobile device 100, begins attempting to spread throughout the network 120. The malware 114 accesses the contact list of the source mobile device 100. As the source mobile device 100 includes, for instance, three lightweight agents within the contacts, and the malware 114 attempts to spread as far as possible, it is probable that the malware 114 unknowingly selects one or more of these lightweight agents. Thus, while contacts are being sent a message by the malware 114, the agent server 130 also receives the message. The agent server 130 receiving the message automatically alerts the service provider that malware 114 is present on the network 120. The contacts which receive the malware 114, the target mobile devices 140, may open the malware 114 and become infected as well. The malware 114 continues to attempt to spread by addressing messages to each of the contacts of the target mobile devices 140. If the target mobile devices 140 also include lightweight agents, the malware 114 spreading from the target mobile devices 140, similar to with the source mobile device 100, sends a message to the selected lightweight agents. The malware 114 may further spread in this manner. The agent server 130 receives messages from any mobile devices with lightweight agents which the malware 114 has addressed. The agent server 130 collects all of these messages and determines a signature of the malware 114. By comparing all of the messages received at the agent server 130, and combining this information with knowledge of the network 120, such as which mobile devices have lightweight agents, the agent server 130 can determine propagation of the malware 114 throughout the network 120. This information may be used to prevent the spread of malware 114 in the future, to stop the current malware 114, etc.

In further embodiments of the subject disclosure, when an attacker selects to send a message to a lightweight agent, the lightweight agent logic 113 collects information concerning other contacts which received the message, how many messages were sent to each contact, etc. This information may all be sent to the agent server 130 automatically, upon request, etc. Such information assists the agent server 130 in determining the propagation of the malware 114 through the network 120.

While only one target mobile device 140 is shown, any number of mobile devices may be recipients of a message and/or may contain a lightweight agent logic 113. The number of mobile devices on the network containing the lightweight agent logic 113 may factor into the algorithm used by the agent logic 113 to determine propagation within the network 120.

While two base transceiver stations 122, 123 are shown in this embodiment, it should be understood that a single base transceiver station would suffice when the source mobile device 100 and the target mobile device 140 are both within the cell served by the single base transceiver station. Communications are sent from the source mobile device 100 to the agent server 130 and/or the target mobile device 140 over the cellular network 120 through the single base transceiver station and from the cellular network 120 to the target mobile device 140 through the single base transceiver station.

Figures 2A, 2B:
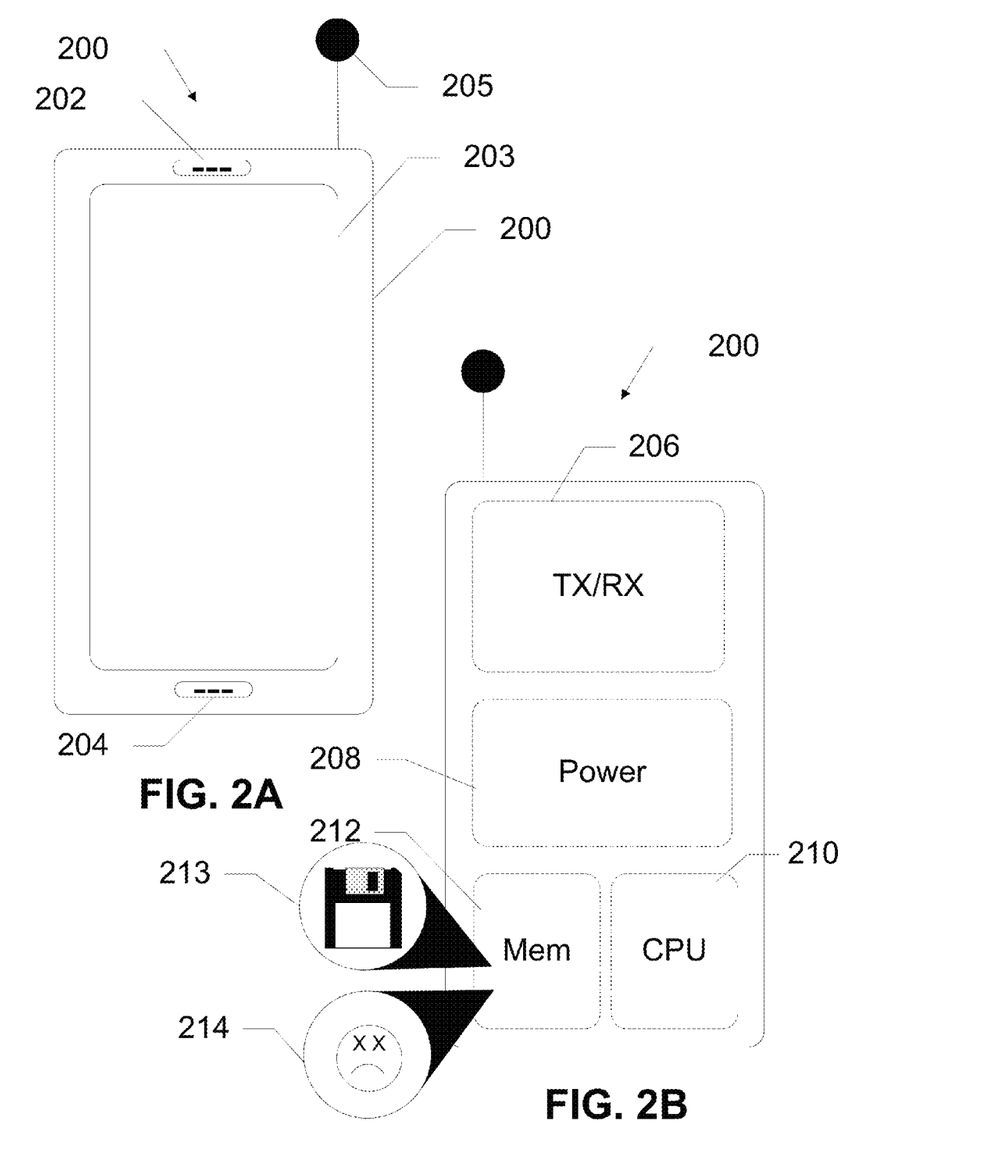
FIGS. 2A and 2B respectively show the external and internal components of a mobile device, according to an exemplary embodiment of the present subject disclosure.

FIGS. 2A and 2B respectively show the external and internal components of a mobile device 200, according to an exemplary embodiment of the present subject disclosure. Mobile device 200 includes a speaker 202, a display 203, a microphone 204, and an antenna 205. Mobile device 200 further includes a transceiver 206, a power supply 208, a central processing unit (CPU) 210, and a memory 212. Speaker 202 provides an audio output for mobile device 200. Display 203 is an LCD, LED or other type of display on which a user can view selections, numbers, letters, etc. Display 203 allows the user to view messages being created or received, view contacts, view dialed numbers, etc. Display 203 can also be a touchscreen, thereby being used as an input device as well. In embodiments not using a touchscreen, a keypad is typically used as an input device, for instance, to type a telephone number or a message. Such a keypad may be a numerical keypad, a QWERTY keyboard, etc. Microphone 204 allows the user to verbally communicate with others using mobile device 200. Antenna 205 is a transducer designed to transmit or receive electromagnetic waves to and from a network. In conjunction with antenna 205, transceiver 206 allows mobile device 200 to wirelessly communicate with a cellular network or with other mobile devices across the cellular network. Transceiver 206 may be a cellular transceiver, wireless transceiver, etc., and includes combinations of transceivers to communicate with assorted wireless networks. Power supply 208 provides power to each of the components of mobile device 200, and can include a battery, as well as an interface to an external power supply. CPU 210 controls components of mobile device 200 according to instructions in logic stored on memory 212. Memory 212 comprises any computer readable medium, such as RAM, ROM, etc. Memory 212 stores a contact list for mobile device 200. This contact list contains addresses, such as telephone numbers, which are used in order to connect voice calls, send an SMS or MMS message, send an e-mail, etc. Memory 212 stores lightweight agent logic 213, in addition to logic for operating the components of mobile device 200. Lightweight agent logic 213 contains instructions for inserting a plurality of lightweight agents into the contacts. These lightweight agents are essentially an address for an agent server on the cellular network disguised as the contacts of mobile device 200. Lightweight agent logic 213 further includes instructions for hiding or distinguishing the lightweight agents from other contacts for the user when the user is viewing the contact list. However, the lightweight agents remain within the contact list. Memory 212 further contains a malware 214. Malware 214 may have been transferred to mobile device 200 via a message, download, website, etc. Malware 214 attempts to propagate from mobile device 200 by selecting contacts from the contact list. To malware 214, the lightweight agents look just like any of the other contacts in contact list. Thus, lightweight agents are just as likely to be selected by malware 214 when malware 214 is attempting to spread to other devices. Malware 214 selects contacts, possibly including one or more of the lightweight agents, and sends an infected message to those contacts.

In other exemplary embodiments of the subject disclosure, rather than being inserted into the contacts by the lightweight agent logic, the lightweight agents are preloaded onto the mobile device by the service provider or downloaded to the mobile device from the service provider. The lightweight agent logic recognizes the lightweight agents and hides them from the user while making the lightweight agents available as contacts to any malware.

Figure 3:
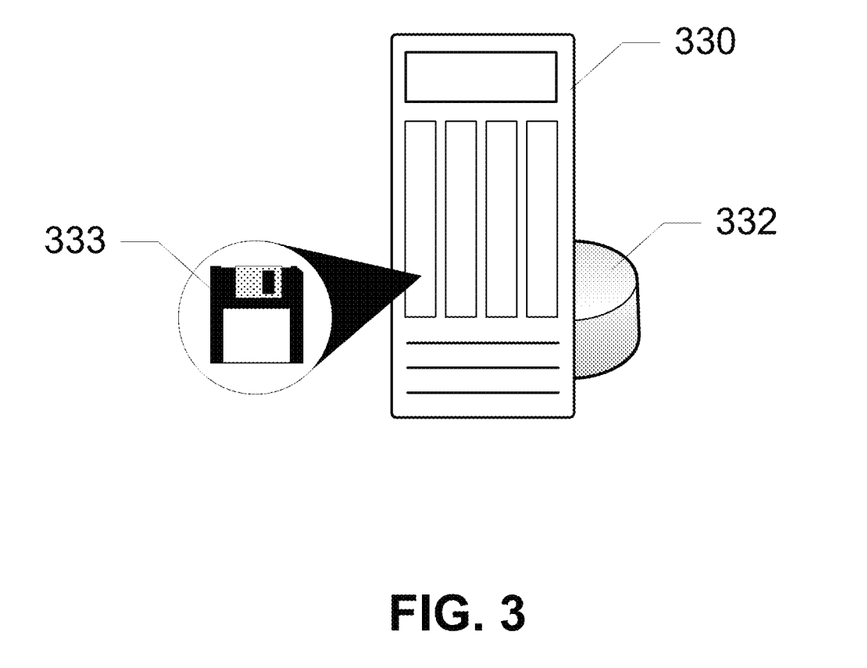
FIG. 3 shows an agent server for detecting messaging-based malware attacks, according to an exemplary embodiment of the present subject disclosure.

FIG. 3 shows an agent server 330 for detecting messaging-based malware attacks, according to an exemplary embodiment of the present subject disclosure. Agent server 330 is an application server located on a cellular network. Agent server 330 includes agent logic 333 and includes or is in communication with an agent database 332. Lightweight agents onboard a plurality of mobile devices on a cellular network are addressed to a location or locations on agent server 330. As lightweight agent logic on the mobile devices has hidden the lightweight agents from the users, any message received at agent server 330 is sent by malware which has unknowingly sent the message to agent server 330. Agent logic 333 detects messages delivered to agent server 330 and alerts the cellular network and/or the service provider that malware is being propagated within the cellular network. Agent logic 333 further determines a signature of the malware. This signature is unique attributes of the message, such as content of the message, the sender of the message, etc., which were inherently sent in the message. Agent logic 333 dissects the message to determine the signature and stores the signature in agent database 332. Agent logic 333 may use the signature, as well as signatures collected from previous messages from the same or different mobile devices, to trace the message to an originator of the malware. Agent server 330 uses agent database 332 to store signatures of the messages in order to later reference these signatures. Comparing the signatures allows agent logic 333 to determine and/or gain as much information as possible about any malware on the cellular network. Agent server 330 utilizes algorithms in agent logic 333 to determine a propagation rate of the malware. Algorithm may utilize, for instance, probability theory and/or sampling theory. This information may be used to predict the spread of the malware on the cellular network. For instance, the algorithm is used to determine a number of mobile devices infected at five minutes, at ten minutes, etc. Thus, agent server 330 knows how many mobile devices are currently infected and agent server 330 can predict future infections. This allows agent server 330 to determine whether the malware will spread, for instance, nationwide, or whether the malware is contained. Agent server 330 may utilize a SIR model to determine susceptible devices, infectious devices, and recovered devices.

In other embodiments of the subject disclosure, agent server 330 may further leverage the information accumulated to instruct mobile devices and/or the cellular network to behave differently going forward. For instance, agent server 330 may notify the cellular network that a certain mobile device contains and is attempting to spread malware. The cellular network may decide to prevent the mobile device from connecting to the cellular network, may limit the capabilities of the mobile device, etc.

Figure 4:
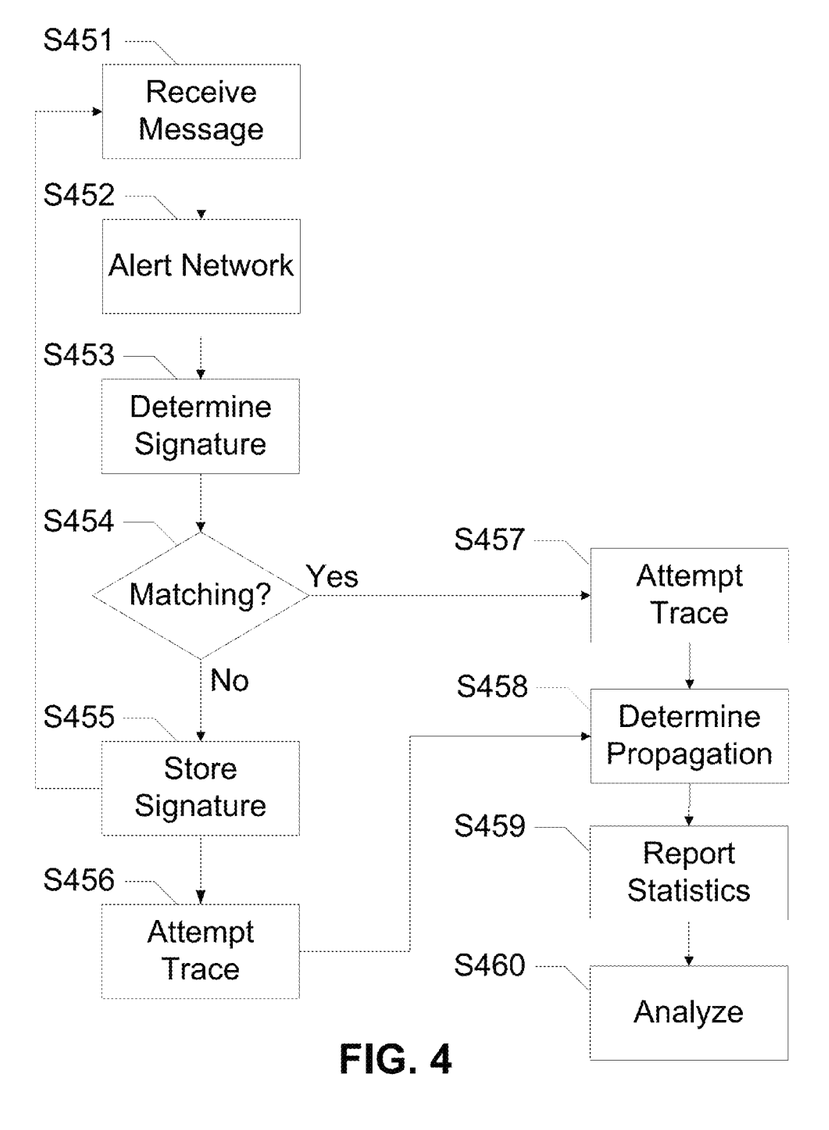
FIG. 4 shows a method of detecting a messaging attack, according to an exemplary embodiment of the present subject disclosure.

FIG. 4 shows a method of detecting a messaging attack, according to an exemplary embodiment of the present subject disclosure. In this embodiment, an agent server 130, 330 is located on a network 120. The agent server 130, 330 is configured to detect malware 114, 214 attacks by receiving messages from a mobile device on the network. The mobile device includes a plurality of lightweight agents. These lightweight agents are included within the contacts of the mobile device, but are not displayed to the user of the mobile device. Malware 114, 214 on the mobile device, intending to propagate through messaging from the mobile device, selects from these contacts. Unknowingly, the malware 114, 214 sends messages to the agent server 130, 330 through the lightweight agents, as the lightweight agents are not hidden from such selection from the contacts. The agent server 130, 330 receives messages from the mobile device S451. As the user of the mobile device does not view the lightweight agents, the user never addresses messages to the agent server 130, 330. Thus, when the agent server 130, 330 receives any messages, the agent server 130, 330 alerts the network 120 and/or the service provider of a malware 114 214 attack S452. The agent server 130, 330, or a server in communication with the agent server 130, 330, determines a signature of the message and captures the signature S453. With lightweight agents on a sufficient number of mobile devices, this may occur within a short period of time after the malware 114, 214 outbreak. This signature includes unique attributes of the message. This may include the sender, the content, etc. The agent server 130, 330 uses the signature to determine whether any other messages have been received with a matching signature S454. If no other messages match the signature, the signature and message are stored S455, and the method may begin again with a new message received S451. With the signature stored, the agent server 130, 330 attempts to trace the message back to an originator of the message S456. For instance, it is likely that the mobile device itself received the malware 114, 214 in a message. The signature may allow the agent server 130, 330 to trace the message back to a device which sent the malware 114, 214 to the mobile device. If other messages have been received with the signature, these messages may be included in attempting a trace to the originator of the malware 114, 214 S457. Further, the agent server 130, 330 utilizes logic 113, 333 to determine propagation of the malware 114, 214 through the network 120 S458. This logic 133, 333 may include algorithms utilizing probability theory and/or sampling theory to determine a number of infected devices. This information is gathered and reported to the network 120 and/or the service provider, giving the service provider a current state of propagation of the malware 114, 214 S459. The network 120 and/or the service provider may analyze this information for future prevention or mitigation of attacks S460. This may include predicting a malware 114, 214 propagation trend for the future.

Figure 5:
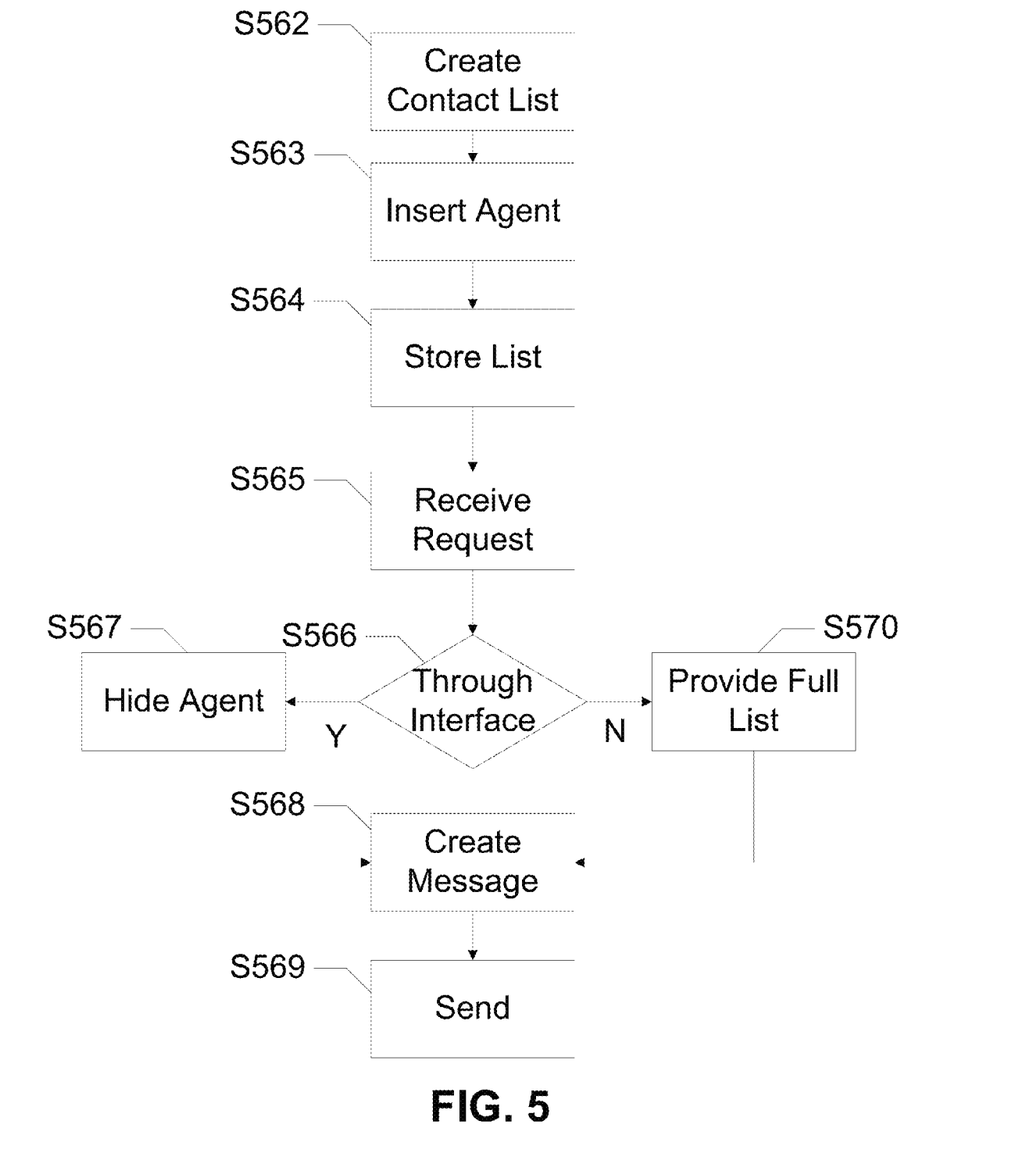
FIG. 5 shows a method of detecting a messaging attack, according to an exemplary embodiment of the present subject disclosure.

FIG. 5 shows a method of detecting a messaging attack, according to an exemplary embodiment of the present subject disclosure. In this embodiment, a source mobile device 100 contains a lightweight agent logic 113, 213 and is in communication with a network 120. The source mobile device 100, or a user of the source mobile device 100, creates a contact list S562. This is a list of stored addresses that may be referenced by the source mobile device 100 for contacting other devices. The lightweight agent logic 113, 213 onboard the source mobile device 100 inserts lightweight agents into the contact list S563. These lightweight agents are essentially an address of one or more agent servers 113, 330 on the network. The source mobile device 100 stores this contact list on a memory for later use S564. The source mobile device 100 then receives a request for contacts S565. It is determined whether this request was received through a contacts interface S566 or, for example, whether an attempt to directly access the contact list is being made. If the contacts are being accessed through the contacts interface, the lightweight agents on the contact list are hidden S567. This is because a user of the mobile device 100 would attempt to access the contacts through such an interface. The user may then select contacts and create a message S568. The message is then sent to the network S569 and delivered to the selected contacts. If the contacts are not being accessed through the contacts interface, the full list of contacts, including the lightweight agents, is provided S570. This is because a malware 114, 214 onboard the mobile device 100 would not likely use a contacts interface, but rather access the contact list directly. The malware 114, 214 would then select contacts, possibly including the lightweight agents, and create a message S568. The message is then sent to the network 120 and delivered to the selected contacts, possibly including an agent server 130, 330 S569.

Figure 6:
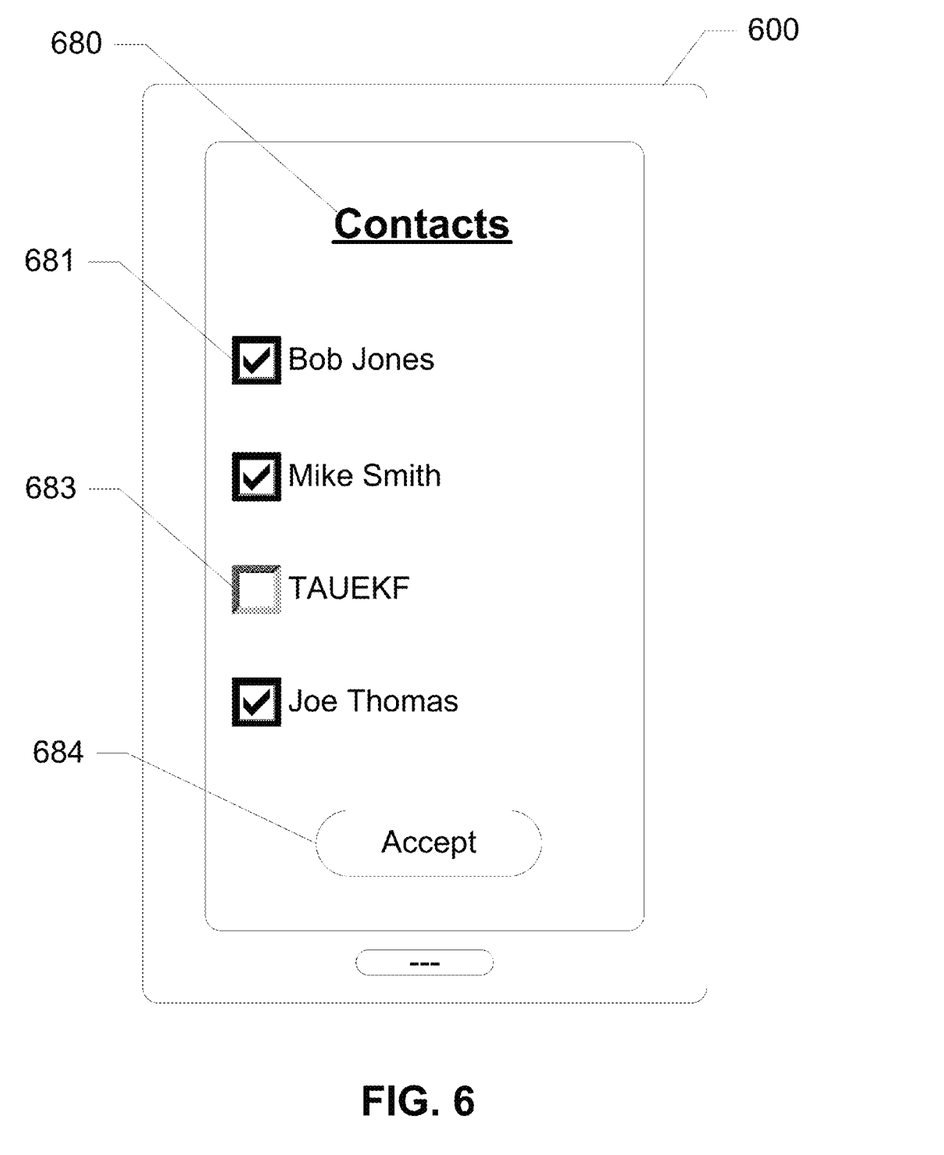
FIG. 6 shows a contact list as viewed through a contacts interface, according to an exemplary embodiment of the present subject disclosure.

FIG. 6 shows a contact list 680 as viewed through a contacts interface, according to an exemplary embodiment of the present subject disclosure. A lightweight agent logic 113, 213 adds a plurality of lightweight agents to the contact list of a mobile device 600. Alternatively, the lightweight agents are loaded onto mobile device 600 by a service provider, etc. In order for the lightweight agents to not be selected by a user of mobile device 600, the lightweight agents are hidden or differentiated from other contacts. Contact list 680 is being viewed to select contacts as recipients of a message, etc. Normal contacts 681 are shown including an outlined selectable check box. Lightweight agent 683 is differentiated from normal contacts 681, as lightweight agent 683 may not be selected from contact list 680. Lightweight agent 683 also has a name that would likely be unrecognizable to the user. Lightweight agent 683 may further be completely hidden from the user and not displayed on contact list 680. Once the user has selected the contacts for the message, the user may activate accept button 684 to begin creation of the message, etc.

While this figure shows an embodiment of a contact list viewed through a contact interface, any other way of differentiating lightweight agents from other contacts is also possible. The purpose of contact interface is that the user of the mobile device is much less likely to accidentally select a lightweight agent as the recipient of a message.

Figure 7:
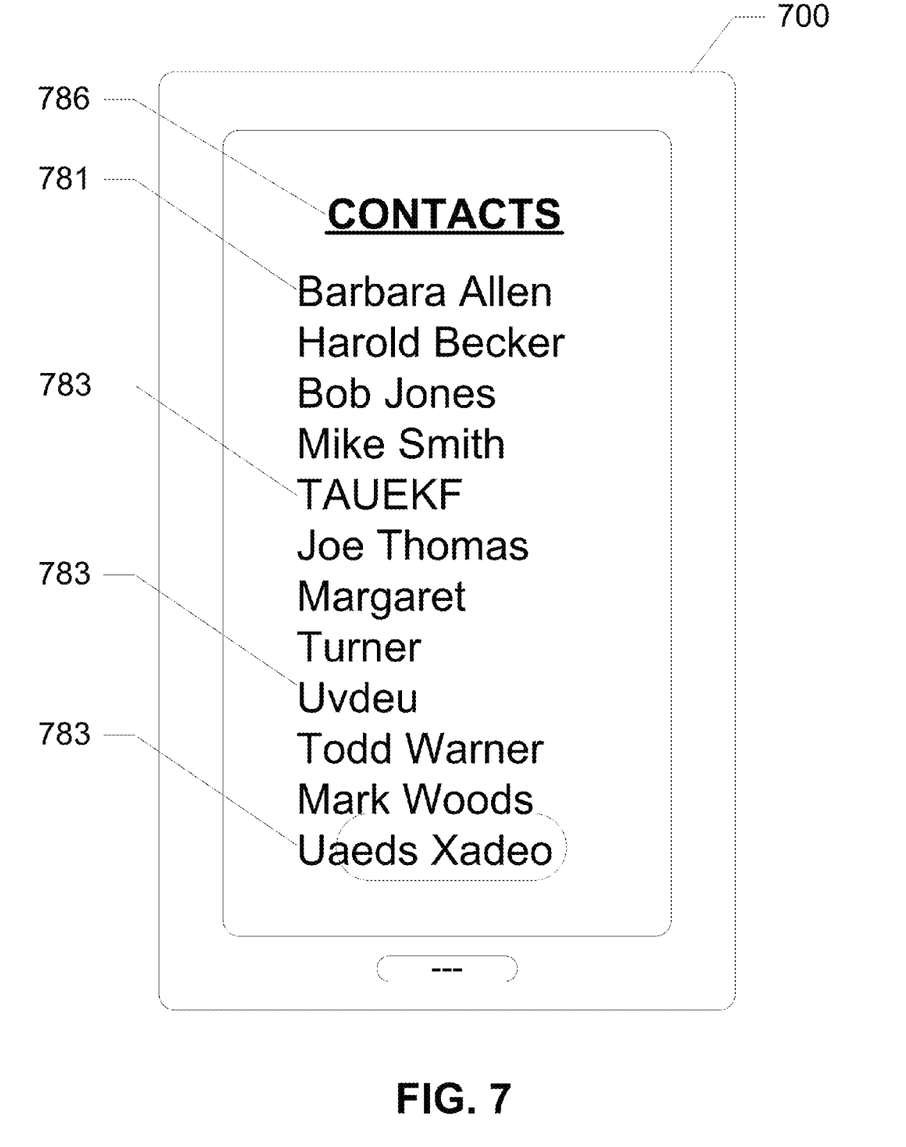
FIG. 7 shows a contact list as viewed directly off of a memory of a mobile device, according to an exemplary embodiment of the present subject disclosure.

FIG. 7 shows a contact list 786 as viewed directly off of a memory 212 of mobile device 700, according to an exemplary embodiment of the present subject disclosure. In this embodiment, contact list 786 includes both normal contacts 781 and lightweight agents 783. However, when viewed directly off of memory 212, normal contacts 781 and lightweight agents 783 are not distinguished. Lightweight agents 783 may take any form, such as all capital letters, one name, two names, etc. to further blend with normal contacts 781. Thus, a malware 114, 214 accessing contact list 786 selects lightweight agents 783 along with normal contacts 781 when attempting to spread. While, as shown, random letters are used for lightweight agents 783, lightweight agents 783 may take the form of actual names in order to confuse the malware 114, 214.

Figure 8:
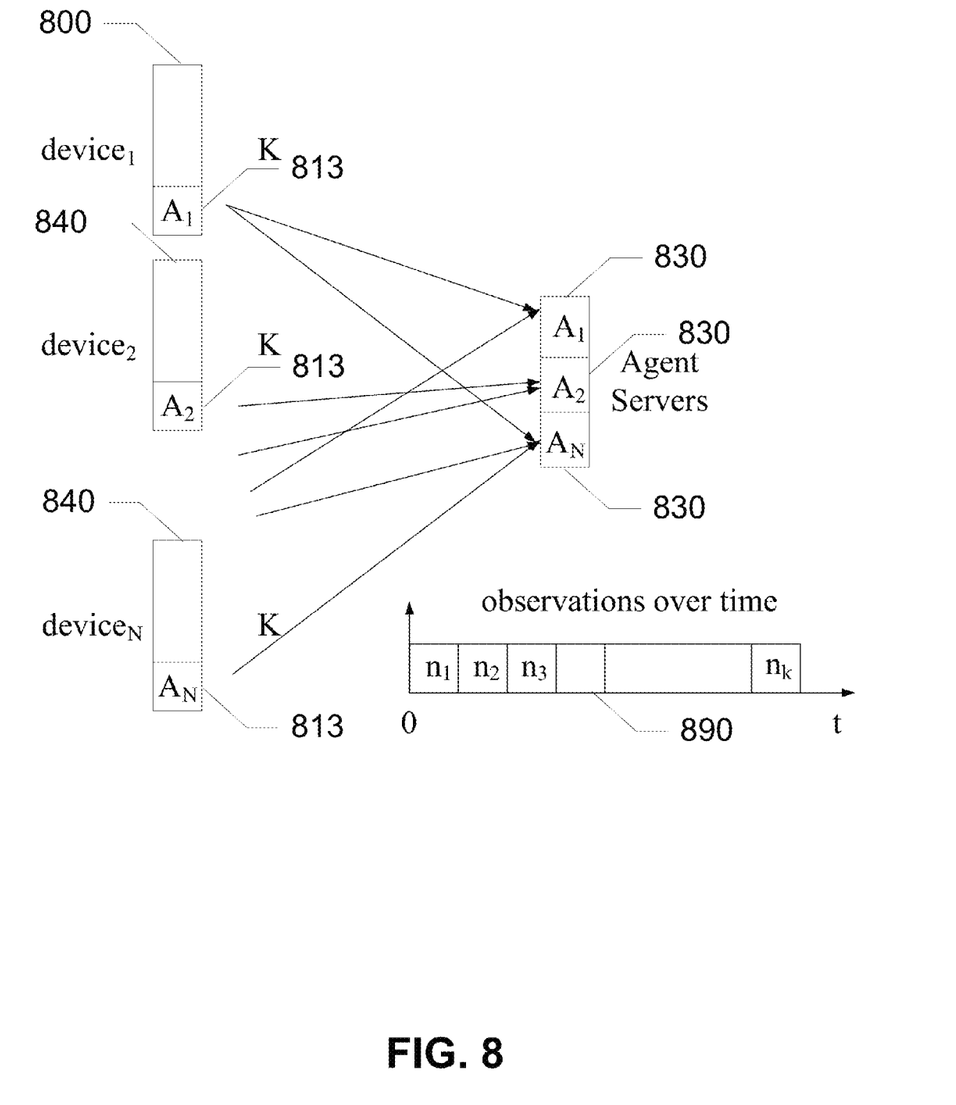
FIG. 8 shows an application of malware detection, according to an exemplary embodiment of the present subject disclosure.

FIG. 8 shows an application of malware 114, 214 detection, according to an exemplary embodiment of the present subject disclosure. The model allows the system to estimate the number of currently active mobile devices spreading malware 114, 214. The model shows a plurality of devices 800 and 840, each with lightweight agents 813 addressed to an agent server 830. Agent servers 830 count the messages received, as observations over time, to estimate a number of devices spreading malware 114, 214. For this model, the following variables are used: The network 120 size is N (i.e. 10000 devices). The number of contacts per device 800, 840 is K (i.e. 50 contacts/device). The number of lightweight agents 813 per device 800, 840 is A (i.e. 3 agents/device). The number of random malware 114, 214 picks is m (i.e. 4 contacts to send SMS/MMS for propagation).

If an infected mobile device 800, 840 picks m out of K contacts to send messages, then there is a probability of p(t) that an SMS/MMS message will be sent to at least one agent server 830 via a lightweight agent. By counting the number of total messages received at all agent servers 830 n(t) for time t, the system can estimate the number of currently active mobile devices 800, 840 spreading malware 114, 214. With the propagation model m(t), the system can estimate the total number of infected phones 800, 840 in the whole network 120.

The observations at the agents are a time sequence $\{n_j\}$. Based on these observations over time, the system calculates the probability that an SMS/MMS is sent to at least one agent as p(t). Then the system estimates the number of currently active phones 800, 840 spreading malware 114, 214 as $\hat{s}(t)$.

$$p(t) = 1 - \frac{K-A}{K} \times \frac{K-A-1}{K-1} \times \ldots \times \frac{K-A-(m-1)}{K-(m-1)}$$
$$= 1 - \prod_{i=0}^{m-1} \frac{K-A-i}{K-i}$$

$$\hat{s}(t) = \frac{n(t)}{p(t)}$$

One direct application of the system is to assist generating attack signatures. Since the total number of mobile devices 800, 840 in the network 120 is large, the probability of malware 114, 214 picking one of the lightweight agents on a mobile device 800, 840 for any attack is high. Therefore, the network 120 or service provider will receive a copy of such an attack message whenever the attack is launched.

Another application is to assist understanding the status of malware 114, 214 propagation. Theoretically, the agent server 830 can estimate the status based on the number of messages it receives, by applying the above model.

The system was validated by simulating SMS/MMS attacks and comparing the estimation algorithm with the simulation results with the assumption that for each mobile device 800, 840, there are fifty contacts in the contact list, and only three of the contacts are lightweight agents. The validation was run with the malware 114, 214 on the source mobile device 100 randomly picking around three to eight contacts to send an SMS/MMS message.

The validation showed that on each mobile device 800, 840, by deploying only a small number of lightweight agents compared to the total contact number (3/50=6%), the overall performance is very satisfactory. The real infected mobile device 800, 840 population converges on the theoretical estimated number. This verifies that the estimation value can predict the number of infected mobile devices 800, 840, with very high estimation accuracy.

The system provides many benefits. For instance, the technology can be massively deployed on every mobile device 800, 840 in the network 120, as the technology is almost weightless. The system utilizes passive detection, which will not use any of the radio resources when the network 120 is attack free.

Further, the technology can detect the malware 114, 214 on day one. Whenever a SMS/MMS message is received at the agent server 830, the message discloses malware 114, 214 signatures. Any time a message based attack is launched, the successful detection rate of the system in real time is near 100% because the probability of having at least one lightweight agent used is close to 100%.

The system helps in understanding an overall malware 114, 214 propagation status in the network 120, benefiting service providers in further prevention. Additionally, by tracing back the phone numbers, the infected mobile devices 800, 840 can be identified, which assists in deploying mitigation plans (i.e.

patch for customers). Further, the mechanism can also be used to detect message and email attacks on devices such as laptops and PCs.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. For instance, communication between mobile devices and network elements can be accomplished by Internet Protocol (IP) addressing, Session Initiation Protocol (SIP) signaling over an IP Multimedia System (IMS), Voice over IP (VoIP), etc. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A mobile device comprising:
a processor; and
a memory storing a lightweight agent logic, the lightweight agent logic comprising instructions which, when executed by the processor, cause the processor to perform operations comprising
inserting a lightweight agent into a plurality of contacts stored on the memory to create a contact list, the lightweight agent comprising an address of an agent server on a network, wherein the lightweight agent is disguised as one of the plurality of contacts so that a malware on-board the mobile device recognizes the lightweight agent as one of the plurality of contacts,
receiving a request for a contact,
determining whether the request for the contact was received via a contacts interface,
in response to determining that the request was not received via the contacts interface, providing the contact list with the lightweight agent of the contact list provided in a manner that is not distinguishable from the plurality of contacts of the contact list to enable the lightweight agent to be selected by the malware on board the mobile device, wherein the malware sends a message to the agent server, the message being aimed at spreading the malware, and
in response to determining that the request was received via the contacts interface, providing the contact list with the lightweight agent of the contact list displayed differently from the plurality of contacts of the contact list so that the lightweight agent is distinguishable from the plurality of contacts.

2. The mobile device of claim 1, wherein the agent server receives the message from the mobile device and alerts a service provider, and wherein the agent server determines a signature of the malware, the signature of the malware comprising at least one of a content of the message or a sender of the message.

3. The mobile device of claim 1, wherein the message is at least one of a short message service message or a multimedia messaging service message.

4. The mobile device of claim 1, wherein the lightweight agent is loaded on the memory in response to a user input.

5. The mobile device of claim 1, wherein the lightweight agent is loaded on the memory by a manufacturer of the mobile device.

6. The mobile device of claim 1, wherein providing the contact list with the lightweight agent of the contact list displayed differently from the plurality of contacts of the contact list so that the lightweight agent is distinguishable from the plurality of contacts comprises one of providing the contact list with the lightweight agent of the contact list displayed in a first color different from a second color used to display the plurality of contacts of the contact list or providing the contact list with the lightweight agent of the contact list displayed in a first contrast different from a second contrast used to display the plurality of contacts of the contact list.

7. A memory storing a lightweight agent logic comprising instructions that, when executed by a processor of a mobile device, cause the processor to perform operations comprising:
inserting a lightweight agent into a plurality of contacts stored on the memory to create a contact list, the lightweight agent comprising an address of an agent server on a network, wherein the lightweight agent is disguised as one of the plurality of contacts so that a malware on-board the mobile device recognizes the lightweight agent as one of the plurality of contacts;
receiving a request for a contact;
determining whether the request for the contact was received via a contacts interface;
in response to determining that the request for the contact was not received via the contacts interface, providing the contact list with the lightweight agent of the contact list provided in a manner that is not distinguishable from the plurality of contacts of the contact list to enable the lightweight agent to be selected by the malware on board the mobile device, wherein the malware sends a message, the message being aimed at spreading the malware; and
in response to determining that the request was received via the contacts interface, providing the contact list with the lightweight agent of the contact list displayed differently from the plurality of contacts of the contact list so that the lightweight agent is distinguishable from the plurality of contacts.

8. The memory of claim 7, wherein providing the contact list with the lightweight agent of the contact list displayed differently from the plurality of contacts of the contact list so that the lightweight agent is distinguishable from the plurality of contacts comprises one of providing the contact list with the lightweight agent of the contact list displayed in a first color different from a second color used to display the plurality of contacts of the contact list or providing the contact list with the lightweight agent of the contact list displayed in a first contrast different from a second contrast used to display the plurality of contacts of the contact list.

9. The memory of claim 7, wherein the agent server alerts a service provider.

10. The memory of claim 7, wherein the agent server receives the message from the malware and determines a signature of the malware, the signature of the malware comprising at least one of a content of the message or a sender of the message, and wherein the agent server compares the signature of the message with previous signatures.

11. The memory of claim 10, wherein the previous signatures are stored in an agent database.

12. The memory of claim 7, wherein the message is at least one of a short message service message or a multimedia messaging service message.

13. A method comprising:
inserting a lightweight agent, using a lightweight agent logic executing on a mobile device, into a plurality of contacts stored on a memory of the mobile device to create a contact list, the lightweight agent comprising an address of an agent server on a network, wherein the lightweight agent is disguised as one of the plurality of contacts so that a malware on-board the mobile device recognizes the lightweight agent as one of the plurality of contacts;
receiving, at the mobile device, a request for a contact;
determining, using the lightweight agent logic executing on the mobile device, whether the request for the contact was received via a contacts interface;
in response to determining that the request for the contact was not received via the contacts interface, providing, by the mobile device, the contact list with the lightweight agent of the contact list provided in a manner that is not distinguishable from the plurality of contacts of the contact list to enable the lightweight agent to be selected by the malware on board the mobile device, wherein the malware sends a message to the agent server, the message being aimed at spreading the malware; and
in response to determining that the request was received via the contacts interface, providing, by the mobile device, the contact list with the lightweight agent of the contact list displayed differently from the plurality of contacts of the contact list so that the lightweight agent is distinguishable from the plurality of contacts.

14. The method of claim 13, wherein the agent server receives the message from the malware and determines a signature of the malware, the signature of the malware comprising at least one of a content of the message or a sender of the message, and wherein the method further comprises comparing the signature to a previous signature of a previously received message.

15. The method of claim 14, further comprising storing the signature of the malware.

16. The method of claim 14, wherein the previous signature of the previously received message is stored in an agent database.

17. The method of claim 13, further comprising alerting a service provider upon receiving the message at the agent server.

18. The method of claim 17, further comprising alerting the service provider of a state of propagation of the malware.

19. The method of claim 13, wherein providing the contact list with the lightweight agent of the contact list displayed differently from the plurality of contacts of the contact list so that the lightweight agent is distinguishable from the plurality of contacts comprises one of providing the contact list with the lightweight agent of the contact list displayed in a first color different from a second color used to display the plurality of contacts of the contact list or providing the contact list with the lightweight agent of the contact list displayed in a first contrast different from a second contrast used to display the plurality of contacts of the contact list.

20. The method of claim 13, wherein inserting the lightweight agent, using the lightweight agent logic executing on the mobile device, into the plurality of contacts stored on the memory of the mobile device comprises inserting the lightweight agent, using the lightweight agent logic executing on the mobile device, into the plurality of contacts stored on the memory of the mobile device in response to a manufacturer input.

* * * * *